United States Patent
Karnik et al.

(10) Patent No.: US 8,315,776 B2
(45) Date of Patent: *Nov. 20, 2012

(54) MODELING CATALYST EXOTHERM DUE TO BLOWTHROUGH

(75) Inventors: Amey Y. Karnik, Dearborn, MI (US); Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,214

(22) Filed: Mar. 12, 2012

(65) Prior Publication Data

US 2012/0159933 A1 Jun. 28, 2012

Related U.S. Application Data

(63) Continuation of application No. 12/481,468, filed on Jun. 9, 2009, now Pat. No. 8,135,535.

(51) Int. Cl.
*F02D 41/00* (2006.01)
*F02D 41/02* (2006.01)

(52) U.S. Cl. ........................................ 701/102; 123/676
(58) Field of Classification Search .................. 701/102, 701/108, 109, 113; 123/90.15, 676, 689, 123/703; 60/299, 598, 276

See application file for complete search history.

(56) References Cited

U.S. PATENT DOCUMENTS

| | | | |
|---|---|---|---|
| 5,590,521 A | 1/1997 | Schaibel et al. | |
| 5,722,236 A * | 3/1998 | Cullen et al. | 60/274 |
| 6,637,386 B2 * | 10/2003 | Murata et al. | 123/90.15 |
| 7,155,899 B2 * | 1/2007 | Beer et al. | 60/284 |
| 7,257,941 B1 | 8/2007 | Reuter | |
| 7,266,944 B2 | 9/2007 | Okugawa et al. | |
| 7,275,516 B1 | 10/2007 | Cunningham et al. | |
| 2005/0228572 A1 | 10/2005 | Mansbart | |

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Modeling catalyst exotherm due to blowthrough is provided. The method of advantageously utilizes catalyst temperature based on an amount of blowthrough air and a combustion air-fuel ratio generating a catalyst exotherm.

14 Claims, 6 Drawing Sheets

MODELING CATALYST EXOTHERM DUE TO BLOWTHROUGH

CROSS REFERENCE TO RELATED APPLICATIONS

The present application is a continuation of U.S. patent application Ser. No. 12/481,468 filed Jun. 9, 2009, the entire contents of which are incorporated herein by reference for all purposes.

TECHNICAL FIELD

The present application relates to a method for calculating exhaust temperature that includes the effect of blowthrough air on engine operation.

BACKGROUND AND SUMMARY

Engine exhaust gases may be treated by a catalyst to purify the exhaust emissions by chemical reaction as the exhaust gases flow through the catalyst. As an example, a catalytic converter containing a catalyst may be located at the exhaust pipe, such that the catalyst helps convert carbon monoxide in the exhaust into carbon dioxide. Other reactions may also take place, such as converting hydrocarbons into carbon dioxide and water, and converting nitrogen oxides back into nitrogen and oxygen.

Typically such exhaust gas treatment systems require knowledge of the temperature of the exhaust gas. Further, since the chemical reactions in the catalyst may be exothermic, such that heat is released into exhaust, previous solutions of exhaust gas temperature estimation models include modeling of the additional heat due to the catalytic exotherm.

The inventors of the present application have recognized a problem in such previous solutions, in that such models assume perfect mixing and burning of the complete air and fuel inside the cylinder. However, in the event that air escapes from the intake to the exhaust without getting trapped inside the cylinder (e.g., blowthrough air), this blowthrough air may oxidize any unburned constituents in the exhaust gas in the presence of the catalyst. Such reactions may be exothermic, such that the reactions release heat into the exhaust gases, thereby increasing the catalyst temperature. In some cases, such blowthrough may occur as part of a blowthrough mode (e.g., in turbo applications). By not accounting for this additional heat, typical calculations underestimate the exhaust temperature, which may lead to damage of catalyst materials due to overheating. For these reasons, the inventors of the present application have included the effect of blowthrough air on exhaust gas temperature, and then provided various approaches for advantageously using the improved catalyst temperature estimate.

In one example, some of the above issues may be addressed by a method of calculating a temperature of exhaust from an engine, wherein the method comprises determining a temperature of the exhaust, determining a catalyst exotherm based on an amount of blowthrough air and a combustion air-fuel ratio, and adjusting the determined temperature of the exhaust based on the determined catalyst exotherm. The determined temperature may include a catalyst temperature, such as a catalyst mid-bed temperature. Additionally, the temperatures may be determined taking into account the amount of exotherm occurring in the exhaust port and/or manifold, versus the amount of exotherm occurring in the catalyst. Further, various parameters may be adjusted based on the exhaust (e.g., catalyst) temperature, such as engine air-fuel ratio, engine airflow, and/or others to compensate for the increased temperature and/or to abate the increased temperature.

In this way, it is possible to obtain accurate exhaust and/or catalyst temperatures, even during conditions generating blowthrough, such as boosted intake-exhaust valve overlap conditions with rich combustion in the engine cylinder. For example, in the case of an overall stoichiometric exhaust air-fuel mixture, the engine may be fueled for rich combustion during a boosting operation. Thus, excess fresh air that blows through the cylinder mixes the rich combustion gases to form an overall stoichiometric air-fuel ratio. In such a case, the rich air-fuel mixture in the cylinder may produce higher levels of CO, which then combine with oxygen from blowthrough air in an exothermic reaction releasing heat into the exhaust and thus increasing the temperature of the exhaust. However, depending on the exhaust port temperatures, more or less of the exotherm may occur in the exhaust port (and a corresponding less or greater amount may occur in the catalyst). Accordingly, modeling the catalyst exotherm due to blowthrough air, and taking into account whether more or less of the oxidation occurs in the catalyst or elsewhere, allows for a more accurate estimation of exhaust temperature.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
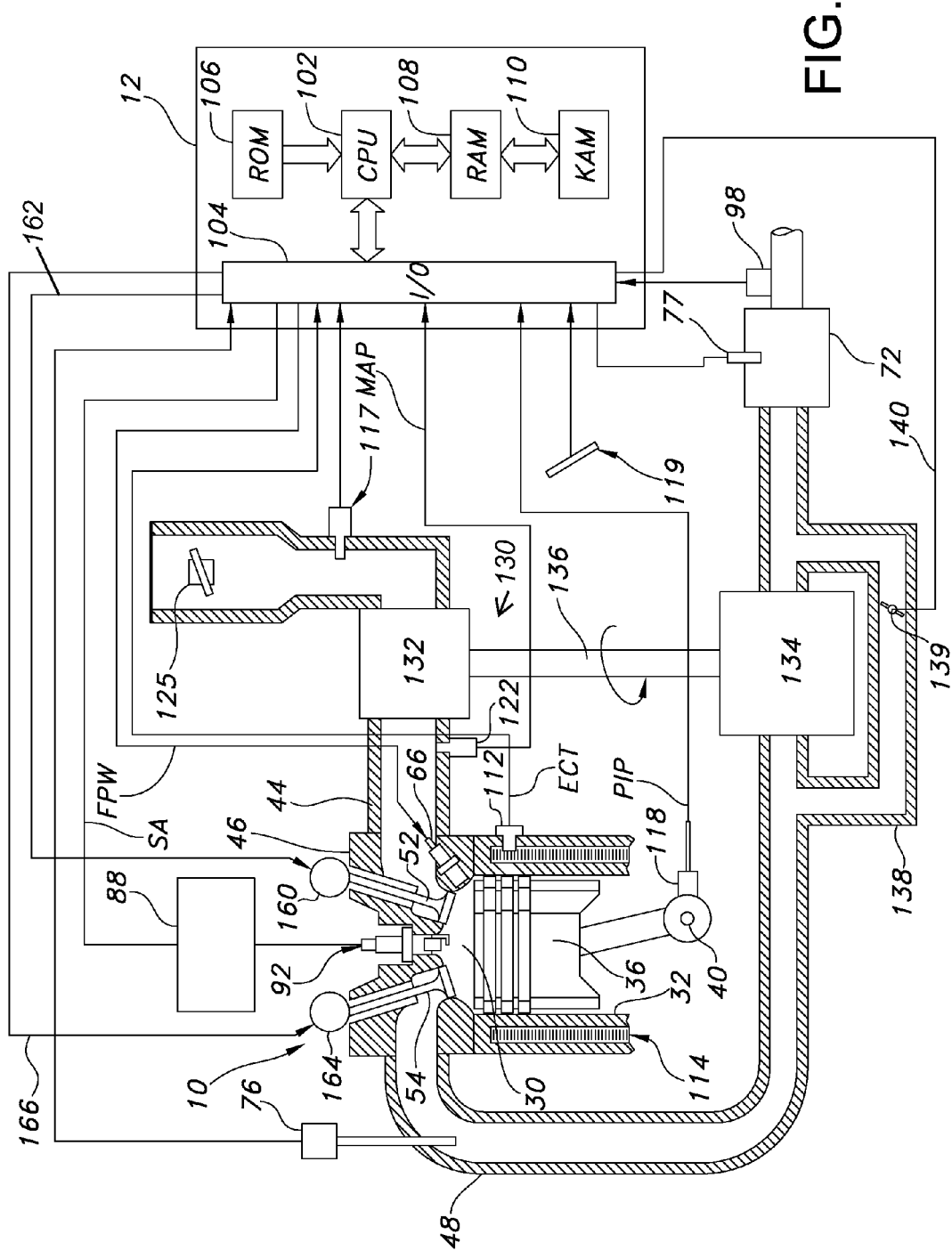
FIG. 1 shows a block diagram of an embodiment of an engine.

As described above, the temperature of the exhaust of an internal combustion engine including a catalyst may be determined based on blowthrough air resulting from positive intake-exhaust valve overlap. In some cases, the blowthrough air may occur in a naturally aspirated (non-boosted) engine. Alternatively, the engine may instead include a turbocharger, and the blowthrough air may result from a boosting operation. Various control actions may be taken based on the determined exhaust and/or catalyst temperature. As an example, FIG. 1 shows an internal combustion engine 10, comprising a plurality of cylinders, one cylinder of which is shown in FIG. 1, is controlled by electronic engine controller 12. Engine 10 includes cylinder head 46, combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. In this example, a single intake valve and exhaust valve are shown; however, there may be multiple intake valves and/or multiple exhaust valves. Each intake and exhaust valve may be operated by a camshaft, or both may be operated by a common camshaft. Variable valve timing operation may be used via a hydraulic actuator. In an alternative embodiment, the valves may be operated by an electromechanically controlled valve coil and armature assembly. In the example of FIG. 1, an intake cam 160 is shown for actuating valve 52, where the intake cam may have variable timing which is controlled via signal 162. Likewise, an exhaust cam 164 is shown for actuating valve 54, where the exhaust cam may have variable timing which is controlled via signal 166.

Cylinder 30 is also shown having direct fuel injector 66 coupled thereto for delivering liquid fuel in proportion to the pulse width of signal FPW from controller 12 via a fuel injection system (not shown), which may be a high pressure common gasoline fuel system. The fuel system may include a fuel tank, high and/or low pressure fuel pumps, and a fuel rail. The engine 10 of FIG. 1 is configured such that the fuel is injected directly into the engine cylinder, which is known to those skilled in the art as direct injection. In addition, intake manifold 44 is shown communicating with optional electronic throttle 125.

In the example of FIG. 1, cylinder head 46 is shown having fuel injector 66 coupled thereto in a side-injection position. However, the injector may also be positioned in an over-head position, such as adjacent spark plug 92, in an alternative embodiment. FIG. 1 also shows distributorless ignition system 88 providing ignition spark to combustion chamber 30 via spark plug 92 in response to controller 12.

In some embodiments, engine 10 may be coupled to a turbocharger system 130, which is one example compression device that may be used. Turbocharger system 130 includes a compressor 132 on the intake side and a turbine 134 on the exhaust side coupled via a shaft 136. In an alternative embodiment, a two-stage turbocharger may be used, if desired. In another alternative embodiment, a supercharger may be used having a compressor similar to compressor 132 that is driven via the engine crankshaft 40.

Various types of turbochargers and arrangements may be used. For example, a variable geometry turbocharger (VGT) may be used where the geometry of the turbine and/or compressor may be varied during engine operation. Alternately, or in addition, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 139 acting as a waste gate in bypass passage 138 around turbine 134. Waste gate 139 receives a control signal 140 from controller 12. As noted above, the valve may be located within the turbine, or may be a variable nozzle. Also, a twin turbocharger arrangement, and/or a sequential turbocharger arrangement, may be used if desired.

Universal Exhaust Gas Oxygen (UEGO) sensor 76 is shown coupled to exhaust manifold 48 upstream of turbine 134 and emission control device 72. Device 72 may be a NOx catalyst, an SCR (selective catalytic reduction) catalyst, a particulate filter, or combinations thereof. A second exhaust gas oxygen sensor 98 is shown coupled to the exhaust system downstream of catalytic converter 72. Emission control device temperature is measured by temperature sensor 77, and/or estimated based on operating conditions such as engine speed, load, air temperature, engine temperature, and/or airflow, or combinations thereof.

Controller 12 is shown in FIG. 1 as a microcomputer including: microprocessor unit 102, input/output ports 104, and read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement (ACT) of engine air charge temperature or manifold temperature from temperature sensor 117; and an engine position sensor from a Hall effect sensor 118 sensing crankshaft 40 position. Engine position sensor 118 may produce a predetermined number of pulses each revolution of the crankshaft from which engine speed (RPM) can be determined.

In some embodiments, the engine may be coupled to an electric motor/battery system in a hybrid vehicle. The hybrid vehicle may have a parallel configuration, series configuration, or variations or combinations thereof.

Continuing with FIG. 1, it shows catalytic converter 72, which can include multiple catalyst bricks, in one example. In another example, multiple emission control devices, each with multiple bricks, can be used. Converter 72 can be a three-way type catalyst in one example.

Figure 2:
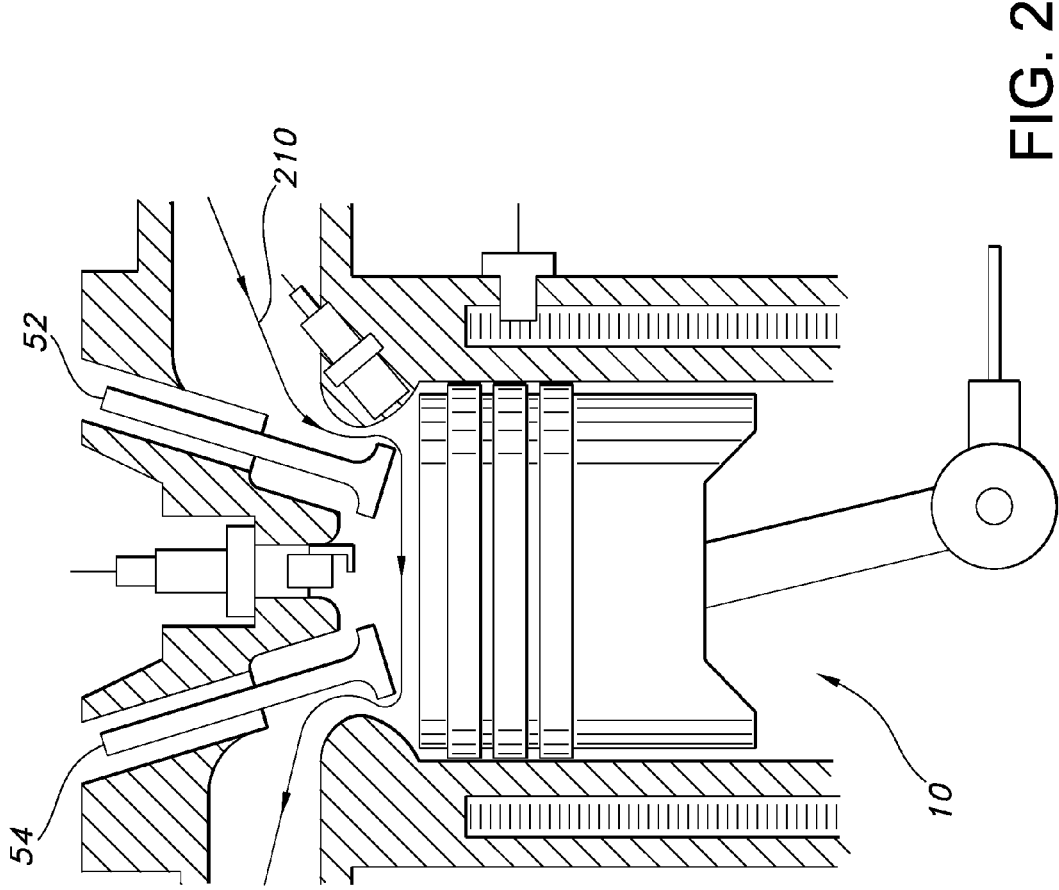
FIG. 2 shows an expanded view of an embodiment of an engine during a valve overlap condition.

As described in more detail herein, engine 10 may be operated under a variety of modes, including a boosted condition in which valve overlap near top dead center (TDC) is present. Such operation reduces residual under a pressure charged condition. Specifically, variable valve timing, pressure boosting, and direct injection fueling (e.g., in-cylinder injection) after exhaust valve closing (EVC) may be used to reduce charge temperatures and reduce the tendency for auto ignition (knock), thus enabling improved torque output and fuel economy under selected conditions. However, under some conditions during the valve overlap in which both intake and exhaust valves are concurrently at least partially open near TDC (end of exhaust stroke, beginning of intake stroke) and intake manifold pressure is higher than exhaust pressure (due to boosting), fresh charge that does not participate in combustion may flow through to the exhaust manifold. Such a condition is illustrated by the flow path 210 in FIG. 2 which shows an enlarged view of the engine 10 from FIG. 1.

This process may result in a "loss" of fresh air charge to the exhaust system, which may be referred to as a scavenging effect. As described in more detail below, this air amount may be compensated for in various routines in controller 12, such as fueling, spark timing, boosting control, etc. Under some conditions during such operation where fresh charge passes through to the exhaust without being present in the cylinder during combustion, a rich air-fuel ratio during combustion is utilized so that the overall exhaust air-fuel ratio may be retained about stoichiometry. Alternatively, under other conditions, a stoichiometric combustion air-fuel ratio is utilized, and thus a lean overall exhaust air-fuel may be obtained. Further, under still other conditions, a lean combustion air-fuel ratio is utilized, and thus an even more lean overall exhaust air-fuel may be obtained. In one example where the combustion performed less rich than needed to obtain a stoichiometric exhaust mixture, a second post injection of fuel may be used to provide unburned fuel to react with excess oxygen to maintain exhaust mixture air-fuel ratio about stoichiometry.

In the above example where scavenging causes fresh charge to pass through to the exhaust along with rich combustion, the combustion air-fuel ratio may be controlled so that the overall exhaust air-fuel ratio is approximately stoichiometric, lean, or rich. As such, under some conditions, there may be an exothermic reaction in the exhaust which generates heat in the exhaust system. Such operation could be used to increase speed of the turbocharger, for example.

However, under other conditions, such an exothermic reaction may cause the catalyst temperature to become higher than a threshold allowed catalyst temperature above which catalyst degradation may occur. Under these conditions, various control actions may be taken, such as implementing a component over-temperature protection routine to adjust an operating parameter to reduce a temperature of the catalyst.

Further, the entire catalyst exotherm may not occur entirely at the catalyst, but may also occur at other places inside the exhaust path, such as at the exhaust port. Accordingly, the estimated catalyst exotherm may be adjusted to account for such energy loss due to port oxidation where chemical energy is converted to heat in the exhaust port. By incorporating the effect of blowthrough air on the catalyst exotherm and the effect of the location of where the exotherm occurs, a more accurate estimate of the catalyst exotherm may be achieved and thus potential over-temperature degradation of the catalyst may be reduced.

Figure 3:
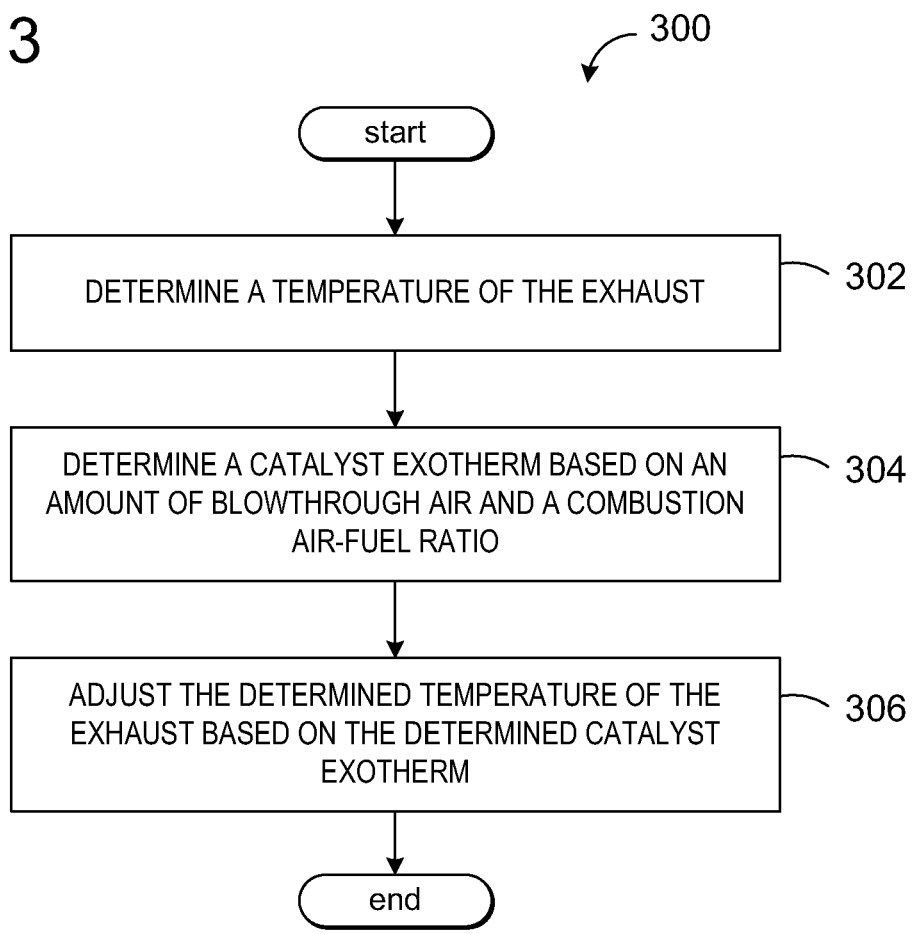
FIG. 3 shows an embodiment of a method of calculating a temperature of exhaust from an internal combustion engine having a catalyst.

FIG. 3 shows an example method 300 of calculating a temperature of exhaust from an internal combustion engine having a catalyst. As described above, under selected conditions, the intake pressure could exceed exhaust pressure due to turbo-charging or supercharging which increases the intake manifold pressure, or, the intake pressure could exceed exhaust pressure due to exhaust tuning where the exhaust pressure after a blow-down pulse is significantly lower than the average exhaust pressure. Under these conditions, fresh air from the intake blows directly into the exhaust without getting trapped inside the cylinder. This scavenging along with improved breathing (higher intake pressure) increases the torque that may be produced.

Method 300 includes the effect of blowthrough air on the estimated exhaust and/or catalyst temperature.

At 302, method 300 includes determining a temperature of the exhaust. The exhaust temperature may be determined by various suitable approaches, such as based on an exhaust temperature sensor coupled in the exhaust manifold 48, and/or based on an estimated exhaust gas temperature based on engine speed and engine load, and further based on various factors such as spark timing, engine airflow, engine combustion air-fuel ratio, engine coolant temperature and/or others/combinations thereof.

At 304, method 300 next includes determining a catalyst exotherm based on an amount of blowthrough air and a combustion air-fuel ratio. In other words, the temperature rise of the exhaust gas due to the energy released from the oxidation of the unburned fuel in the exhaust may be modeled at 304 by accounting for the energy in the exhaust. As described above, the unburned fuel in the exhaust may include fuel that does not get trapped inside the cylinder, for example, the fuel blowing through (e.g., fuel carried via the blowthrough air). The unburned fuel in the exhaust may further include fuel in excess of the amount corresponding to a stoichiometric air-fuel ratio inside the cylinder. The chemical energy of the unburned fuel in the exhaust may equal a chemical energy in exhaust components from partial oxidation. Accordingly, the catalyst exotherm may be based on the total heat released from the oxidization of the fuel in the exhaust and the total exhaust flow. An example method of determining the catalyst exotherm based on an amount of blowthrough air and the combustion air-fuel ratio, among other parameters, is described in more detail below with reference to FIG. 4.

Continuing with FIG. 3, at 306, method 300 includes adjusting the determined temperature of the exhaust based on the determined catalyst exotherm. Such an action may include, for example, adding the determined catalyst exotherm to the determined temperature of the exhaust.

In this way, it is possible to account for the effect of blowthrough air on engine operation. In response to determining the temperature of the exhaust, one or more control actions may be performed. For example, the adjusted determined temperature of the exhaust may be compared to a threshold temperature indicating a heat tolerance of the catalyst, and if it is determined that the exhaust may be too hot, a control action may be performed to reduce the temperature of the catalyst. Performing such control actions is discussed in more detail with reference to FIG. 6.

Figure 4:
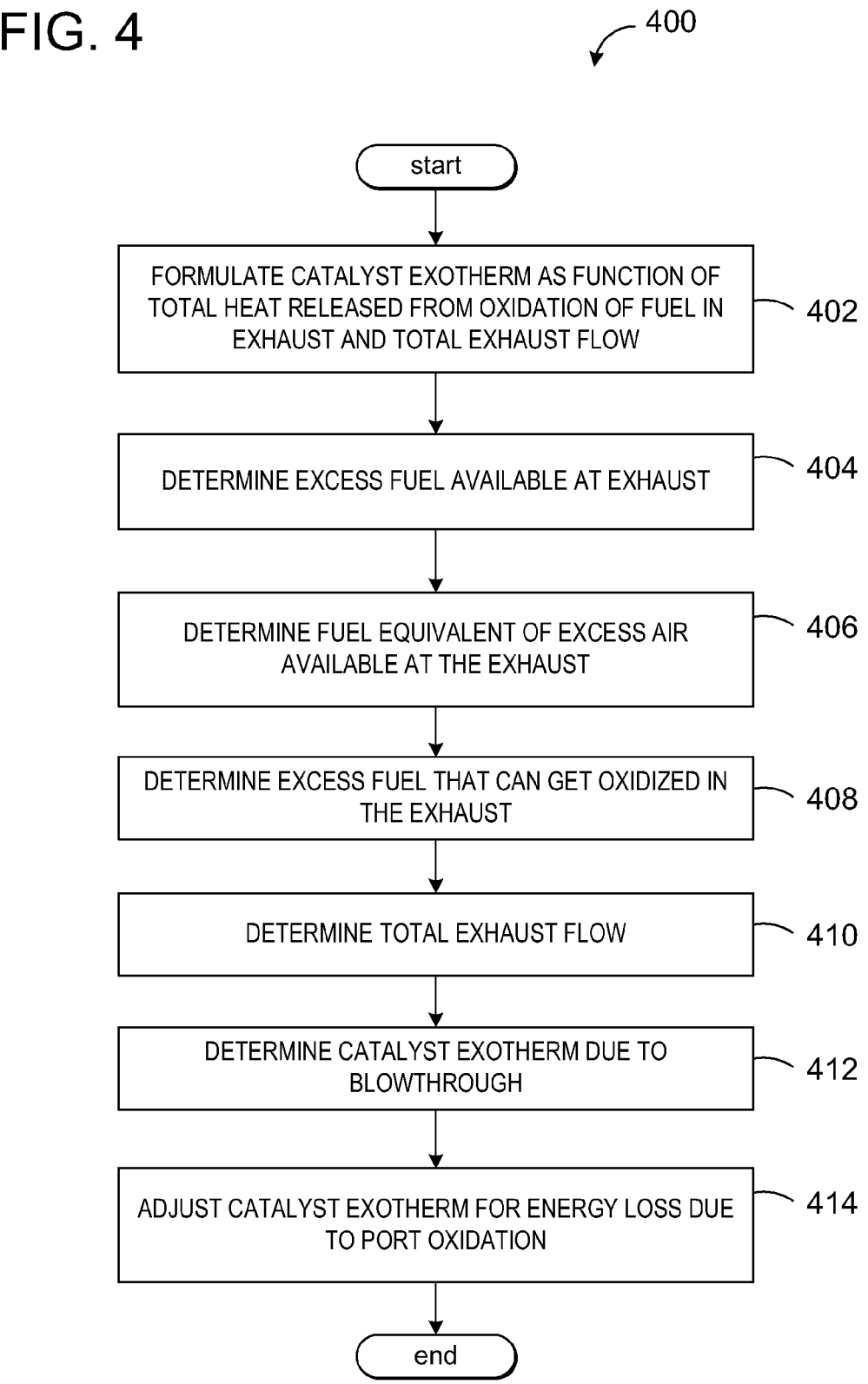
FIG. 4 shows an example method of calculating a catalyst exotherm based on an amount of blowthrough air.

FIG. 4 shows an example method 400 of determining a catalyst exotherm. Such a method may be used, for example, during 304 of method 300. At 402, method 400 includes formulating the catalyst exotherm as a function of the total heat released from the oxidation of fuel in the exhaust and the total exhaust flow. In some embodiments, the catalyst exotherm due to blowthrough, $\Delta T_{bt}$, may be calculated as, $$\Delta T_{bt} = \frac{\overline{Q}_L m_{fuel,exh}^{oxidize}}{c_p m_{tot}}.$$

Here, $m_{tot}$ is the total air flow, $m_{fuel,exh}^{oxidize}$ is the part of excess fuel in the exhaust that may be oxidized, $c_p$ is the specific heat of the exhaust, and $\overline{Q}_L$ is the calorific value of fuel. The excess fuel in the exhaust that may be oxidized in the exhaust, $m_{fuel,exh}^{oxidize}$, may be represented as the minimum of the excess fuel available at the exhaust $m_{fuel,excess}^{available}$ and the amount of fuel that can be oxidized by the air available in the exhaust $m_{air,exh}^{equiv}$ referred to herein as the fuel equivalent of excess air. In other words, $$m_{fuel,exh}^{oxidize} = \min\{m_{fuel,excess}^{available}, m_{air,exh}^{equiv}\}.$$

Accordingly, at 404, method 400 includes determining the excess fuel available at the exhaust. The fuel available at the exhaust may include fuel from the excess fuel inside the cylinder, $m_{fuel,cyl}^{excess}$, and the blowthrough fuel $m_{fuel,bt}$. Thus, $$m_{fuel,excess}^{available} = m_{fuel,cyl}^{excess} + m_{fuel,bt}.$$

The excess fuel inside the cylinder is the remaining fuel that does not get burned, namely, $$m_{fuel,cyl}^{excess} = m_{fuel,cyl} - m_{fuel,cyl}^{burnt}.$$

Here, $m_{fuel,cyl}$ is the total fuel trapped inside the cylinder, $$m_{fuel,cyl} = \frac{m_{air,cyl}}{AFR_{cyl}},$$

which is based on the air-fuel ratio in the cylinder, $AFR_{cyl}$. Taking the fuel burned inside the cylinder to be in a stoichiometric air-fuel ratio to the cylinder air flow, this yields, $$m_{fuel,cyl}^{burnt} = \min\left\{\frac{1}{AFR_{stoich}}, \frac{1}{AFR_{cyl}}\right\} m_{air,cyl}.$$

Returning to the excess fuel available in the exhaust, the blowthrough fuel may then be represented in terms of airflow and air-fuel ratio as follows, $$m_{fuel,bt} = \frac{m_{air,bt}}{AFR_{bt}}.$$

Using the relationship between blowthrough air with airflow and blowthrough fraction $r_{bt}$, namely $m_{air,bt}=r_{bt}m_{air,tot}$, and the relationship between cylinder airflow with airflow and blowthrough fraction $m_{air,cyl}=(1-r_{bt})\,m_{air,tot}$, the blowthrough fuel may be represented in terms of the cylinder airflow as follows, $$m_{fuel,bt} = \frac{m_{air,cyl}}{AFR_{bt}}\left(\frac{r_{bt}}{1-r_{bt}}\right).$$

Accordingly, the excess fuel available at the exhaust may then be represented as, $$m_{fuel,excess}^{available} = \frac{m_{air,cyl}}{AFR_{cyl}} - \min\left\{1, \frac{AFR_{stoich}}{AFR_{cyl}}\right\}\frac{m_{air,cyl}}{AFR_{stoich}} + \frac{m_{air,cyl}}{AFR_{bt}}\left(\frac{r_{bt}}{1-r_{bt}}\right).$$

This may be further simplified to yield the following, $$m_{fuel,excess}^{available} = \left(\frac{1}{\lambda_{cyl}} - \min\left\{1, \frac{1}{\lambda_{cyl}}\right\} + \frac{1}{\lambda_{bt}}\left(\frac{r_{bt}}{1-r_{bt}}\right)\right)\frac{m_{air,cyl}}{AFR_{stoich}},$$

where $\lambda_{cyl}$ and $\lambda_{bt}$ are the air-fuel ratios $$\lambda_{cyl} = \frac{AFR_{cyl}}{AFR_{stoich}} \text{ and } \lambda_{bt} = \frac{AFR_{bt}}{AFR_{stoich}},$$

respectively.

Continuing with FIG. 4, at 406 method 400 includes determining the fuel equivalent of excess air available at the exhaust. The fuel equivalent of the excess air available at the exhaust may be calculated as follows, $$m_{air,exh}^{equiv} = \frac{m_{air,exh}}{AFR_{stoich}}$$

where $m_{air,exh}$ is the excess air in the exhaust obtained from excess air at the port from a lean operation inside the cylinder $m_{air,excess}^{port}$ and/or blowthrough air $m_{air,bt}$. Accordingly, the excess air may be represented as $m_{air,exh}=m_{air,excess}^{port}+m_{air,bt}$.

The excess air at the port may be represented as the difference between the total air trapped inside the cylinder, $m_{air,cyl}$, and the burned air from the cylinder, $m_{air,cyl}^{burnt}$, such that $$m_{air,excess}^{port}=m_{air,cyl}-m_{air,cyl}^{burnt}.$$

The total air trapped inside the cylinder may be burned in the case of rich in-cylinder conditions, whereas with lean in-cylinder conditions, the amount of air burned may equal the amount corresponding to a stoichiometric air-fuel ratio, hence, $$m_{air,cyl}^{burnt} = \min\{m_{air,cyl}, m_{fuel,cyl}AFR_{stoich}\},$$

$$m_{air,cyl}^{burnt} = m_{air,cyl}\min\left\{1, \frac{AFR_{stoich}}{AFR_{cyl}}\right\}.$$

Thus, the excess air at the port given by the above-introduced equation may be simplified as follows, $$m_{air,excess}^{port} = m_{air,cyl} - m_{air,cyl}\min\left\{1, \frac{AFR_{stoich}}{AFR_{cyl}}\right\},$$

$$m_{air,excess}^{port} = \left(1 - \min\left\{1, \frac{1}{\lambda_{cyl}}\right\}\right)m_{air,cyl}.$$

The excess air in the exhaust may then be simplified by combining the above equation for the excess air at the port with the previously-derived blowthrough air equation $$m_{air,bt} = m_{air,cyl}\left(\frac{r_{bt}}{1-r_{bt}}\right),$$

to yield, $$m_{air,exh} = \left(\frac{r_{bt}}{1-r_{bt}} + 1 - \min\left\{1, \frac{1}{\lambda_{cyl}}\right\}\right)m_{air,cyl}.$$

Accordingly, the fuel equivalent of the air available at the exhaust is then, $$m_{air,exh}^{equiv} = \left(\frac{r_{bt}}{1-r_{bt}} + 1 - \min\left\{1, \frac{1}{\lambda_{cyl}}\right\}\right)\frac{m_{air,cyl}}{AFR_{stoich}}.$$

Continuing with method 400, at 408 method 400 includes determining the excess fuel that can be oxidized in the exhaust. As introduced above, $$m_{fuel,exh}^{oxidize} = \min\{m_{fuel,excess}^{available}, m_{air,exh}^{equiv}\}.$$

Using the equation determined at 404 for the excess fuel available at the exhaust and the equation determined at 406 for the fuel equivalent of the air available at the exhaust, the excess fuel that can be oxidized may be given by, $$m_{fuel,excess}^{oxidize} = \min\left\{\frac{1}{\lambda_{cyl}} - \min\left\{1, \frac{1}{\lambda_{cyl}}\right\} + \frac{1}{\lambda_{bt}}\left(\frac{r_{bt}}{1-r_{bt}}\right),\right.$$

$$\left.\frac{r_{bt}}{1-r_{bt}} + 1 - \min\left\{1, \frac{1}{\lambda_{cyl}}\right\}\right\}\frac{m_{air,cyl}}{AFR_{stoich}}.$$

At 410, method 400 includes determining the total exhaust flow. The total exhaust flow may be represented as, $$m_{tot} = m_{fuel,cyl} + m_{air,cyl} + m_{air,bt} + m_{fuel,bt}$$

Representing the above equation in terms of cylinder airflow, blowthrough fraction and air-fuel ratios, the total exhaust flow becomes, $$m_{tot} = \left(\frac{1}{AFR_{cyl}} + 1 + \left(1 + \frac{1}{AFR_{bt}}\right)\left(\frac{r_{bt}}{1-r_{bt}}\right)\right) m_{air,cyl},$$

$$m_{tot} = \left(\left(\frac{1}{\lambda_{cyl}} + AFR_{stoich}\right) + \left(AFR_{stoich} + \frac{1}{\lambda_{bt}}\right)\left(\frac{r_{bt}}{1-r_{bt}}\right)\right) \frac{m_{air,cyl}}{AFR_{stoich}}.$$

At 412, method 400 includes calculating the catalyst exotherm. Returning to the equation established at 402, the catalyst exotherm $\Delta T_b$, may be given by the following, $$\Delta T_{bt} = \frac{\overline{Q}_L m_{fuel,exh}^{oxidize}}{c_p m_{tot}}.$$

Substituting the equations for $m_{fuel,exh}^{oxidize}$ obtained at 408 and $m_{tot}$ obtained at 410, the catalyst exotherm due to blowthrough may be given by, $$\Delta T_{bt} = \frac{\overline{Q}_L}{c_p} \frac{\min\left\{\left(\frac{1}{\lambda_{cyl}} - \min\left\{1, \frac{1}{\lambda_{cyl}}\right\}\right) + \frac{1}{\lambda_{bt}}\left(\frac{r_{bt}}{1-r_{bt}}\right),\right.}{\frac{1}{\lambda_{cyl}} + AFR_{stoich} + \left(AFR_{stoich} + \frac{1}{\lambda_{bt}}\right)\left(\frac{r_{bt}}{1-r_{bt}}\right)}.$$

In the numerator of the above equation, the minimum operation includes two arguments. The first term enclosed by parentheses within the first argument represents the fuel due to rich in-cylinder operation. The second term of the first argument and the first term of the second argument represent the blowthrough air and fuel. The second term enclosed by parentheses within the second argument represents the air from lean operation. The denominator of the above equation represents the total exhaust flow. This denominator may be further simplified by relating the equivalence ratios of the blowthrough gas, in-cylinder gas and the exhaust gas, namely $\lambda_{bt}, \lambda_{cyl}$ and $\lambda_{exh}$, respectively, by applying the conservation of mass. This relation is given by, $$\frac{1}{\lambda_{exh}} = \frac{1}{\lambda_{cyl}}(1 - r_{bt}) + \frac{1}{\lambda_{bt}} r_{bt}.$$

Accordingly, the resulting equation for the catalyst exotherm due to blowthrough may then be given by, $$\Delta T_{bt} = \frac{\overline{Q}_L}{c_p} \frac{\min\left\{\left(\frac{1}{\lambda_{cyl}} - \min\left\{1, \frac{1}{\lambda_{cyl}}\right\}\right) + \frac{1}{\lambda_{bt}}\left(\frac{r_{bt}}{1-r_{bt}}\right),\right.}{\frac{1}{1-r_{bt}}\left(\frac{1}{\lambda_{exh}} + AFR_{stoich}\right)}.$$

In some embodiments, method 400 may further include, at 414, adjusting the catalyst exotherm due to blowthrough for energy loss due to port oxidation. As described above, during high temperatures at the exhaust port, port oxidation converts some of the chemical energy to heat in the exhaust port itself, which then reduces the blowthrough exotherm at the catalyst. In other words, as the temperature increases at a flange of the exhaust port, more chemical energy is being converted to heat in the exhaust port itself, and therefore the exotherm at the catalyst decreases. Accordingly, a multiplicative factor $f_{fl,mult}(T_{fl})$ may be applied to the catalyst exotherm equation determined at 412 to account for this energy loss, where the multiplicative factor is inversely dependent on the temperature of the exhaust port flange $T_{fl}$. Accordingly as $T_{fl}$ increases, the multiplicative factor decreases, thus decreasing the catalyst exotherm due to blowthrough as follows, $$\Delta T_{bt} = \frac{\overline{Q}_L}{c_p} \frac{\min\left\{\left(\frac{1}{\lambda_{cyl}} - \min\left\{1, \frac{1}{\lambda_{cyl}}\right\}\right) + \frac{1}{\lambda_{bt}}\left(\frac{r_{bt}}{1-r_{bt}}\right),\right.}{\frac{1}{1-r_{bt}}\left(\frac{1}{\lambda_{exh}} + AFR_{stoich}\right)} f_{fl,mult}(T_{fl})$$

Figure 5:
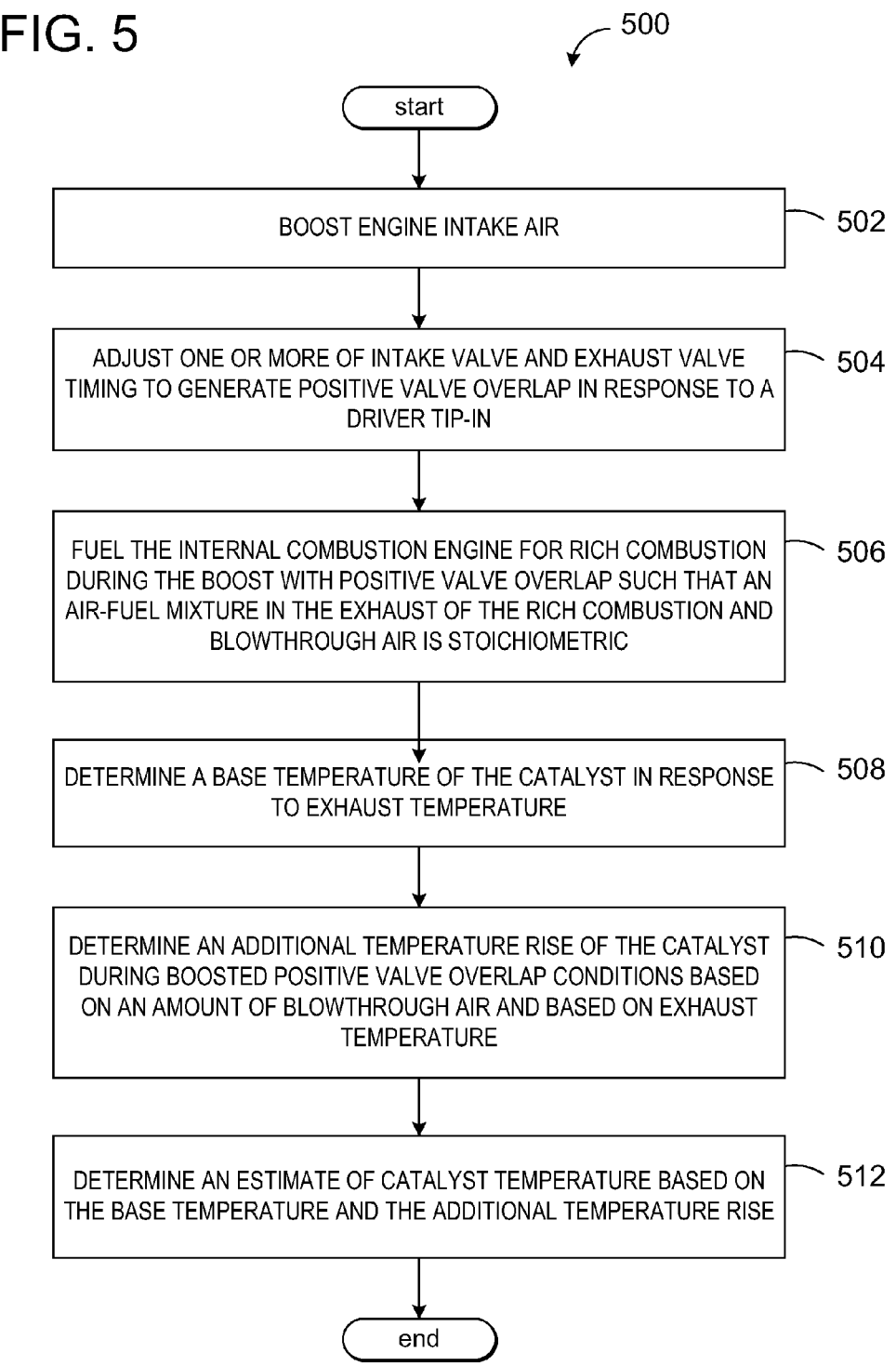
FIG. 5 shows an embodiment of a method of calculating a catalyst exotherm based on an amount of blowthrough air of an internal combustion engine having a turbocharger and a catalyst.

In some cases, the above described methods and procedures may be implemented for an internal combustion engine having a turbocharger and a catalyst. In some cases, the engine may be a port fuel injection engine, where the blowthrough air includes a portion of fuel injected at an intake port into an exhaust manifold. Further, in some cases the engine may be a direct injection engine, where fueling the cylinder for rich combustion during the boosting operation increases a temperature of the exhaust. FIG. 5 depicts an example of implementing a method of calculating a catalyst exotherm in such a scenario. At 502, method 500 includes boosting engine intake air. Such a boost may be performed by, for example, a turbocharger. At 504, method 500 includes adjusting one or more of intake valve and exhaust valve timing to generate positive valve overlap between the intake valve and the exhaust valve. In such a case, the boosting is then generating blowthrough air from an intake manifold to an exhaust manifold of the engine. In one example, the valves may be adjusted to generate such an overlap condition in response to a driver tip-in.

At 506, method 500 includes fueling the internal combustion engine for rich combustion during the boosting with positive valve overlap. As described above, fueling the engine for rich combustion during boosting allows the air-fuel mixture in the exhaust of the rich combustion and blowthrough air to be stoichiometric.

At 508 method 500 includes determining a base temperature of the catalyst in response to exhaust temperature. Such a base temperature may be based on air and fuel trapped in the cylinder. Various suitable approaches may be used to determine the base temperature of the catalyst, such as a map based on engine speed and load, including adjustments for one or more parameters, such as combustion air-fuel ratio, intake air temperature, spark timing retard or advance from peak torque timing, and/or various combinations thereof.

At 510, method 500 includes determining an additional temperature rise of the catalyst during boosted positive valve overlap conditions based on an amount of blowthrough air and based on exhaust temperature. For example, in some cases the additional temperature rise may be based on a total heat released from an oxidization of the fuel in the exhaust and a total exhaust flow. As an example, method 400 may be used to determine the catalyst exotherm due to blowthrough that may be contributing to the temperature rise. In some cases, the additional temperature rise is proportional to the amount of blowthrough air. Further, as described above, the exotherm may be reduced by port oxidation which converts some of the chemical energy to heat in the exhaust port itself. In such a case, the additional temperature rise may then be based on exhaust port temperature, and may decrease as port temperature rises, thus reducing the exotherm due to blowthrough. Accordingly, the additional temperature rise may be determined to be smaller as the exhaust temperature increases.

At 512, method 500 includes determining an estimate of the catalyst temperature based on the base temperature and the additional temperature rise. For example, the estimate of the catalyst temperature may be based on the sum of the base temperature and additional temperature rise.

Figure 6:
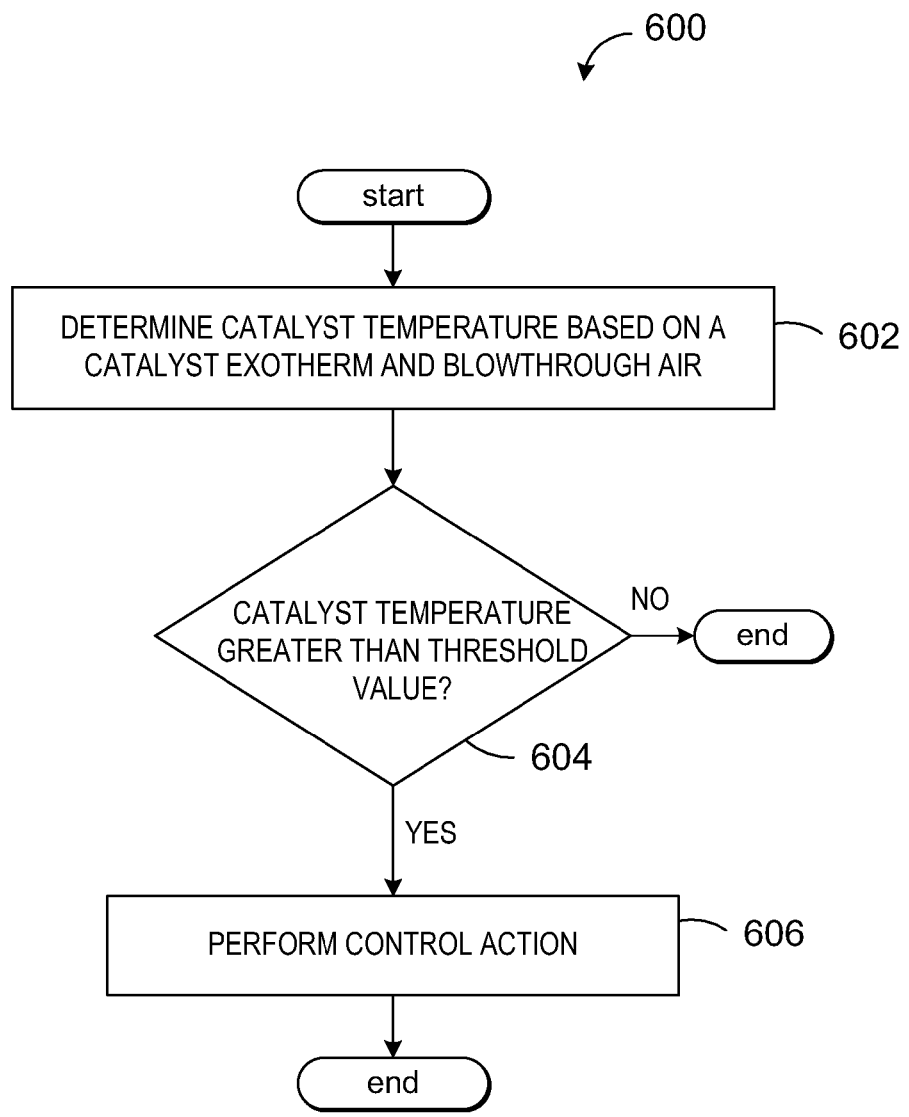
FIG. 6 shows an embodiment of a method of operating an internal combustion engine having a turbocharger and a catalyst based on determination of a catalyst exotherm and blowthrough air.

Further, an internal combustion engine having a turbocharger and a catalyst may be operated based on such an estimate of the exhaust temperature. As an example, FIG. 6 shows an embodiment of such a method. At 602, method 600 includes determining the temperature of the catalyst based on the catalyst exotherm and blowthrough air. Such a determination may include determining the exhaust temperature as described above with reference to FIG. 3, wherein the catalyst exotherm is determined as described above with reference to FIG. 4. Such a determination may further include adjustments to account for port oxidation at the exhaust port.

In one approach, a method may include performing a boosting operation by generating valve overlap between an intake valve and an exhaust valve in response to a driver tip-in, where the boosting operation generates blowthrough air. Such an approach may further include fueling a cylinder of the internal combustion engine for rich combustion during the boosting operation such that an air-fuel mixture in the exhaust is stoichiometric. The method may further include determining a temperature of the exhaust, and determining a base exotherm based on air and fuel trapped in the cylinder, as described above. Such an approach may further include determining a potential exotherm due to blowthrough based on a total heat released from an oxidization of the fuel in the exhaust and a total exhaust flow. This potential exotherm may be adjusted to account for energy loss due to port oxidation where chemical energy is converted to heat in an exhaust port, such that the potential exotherm decreases as a temperature of an exhaust port flange increases. The catalyst exotherm may then be determined based on the base exotherm and the adjusted potential exotherm.

At 604, method 600 includes determining if the temperature of the catalyst is greater than a threshold value. Such a threshold value may be based on a temperature tolerance of the catalyst, wherein exceeding the temperature tolerance of the catalyst may damage catalyst components.

If it is determined that the temperature of the catalyst is greater than the threshold value, then at 606, method 600 includes performing a control action. Such a control action may include, for example, a component over-temperature protection routine to adjust an operating parameter to reduce a temperature of the catalyst. The component over-temperature protection routine may include various suitable actions, such as reducing a degree of richness of an air-fuel ratio of combustion during the boosting operation and/or reducing the amount of valve overlap between the intake valve and the exhaust valve (e.g., by advancing exhaust valve closing and/or retarding intake valve opening). In one particular example, the control action may further include limiting a boost level to be less than a threshold (e.g., reducing boost level) by opening a turbocharger wastegate. In this way, it is possible to reduce the amount of blowthrough air and/or reduce the excess reductant available to generate an exotherm in the exhaust.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of calculating a temperature of exhaust from an internal combustion engine having a catalyst, the method comprising:
    boosting intake air;
    determining a temperature of the exhaust;
    determining a catalyst exotherm based on an amount of blowthrough air and a combustion air-fuel ratio, including determining a total heat released from an oxidation of fuel and determining a total exhaust flow;
    adjusting the determined temperature of the exhaust based on the determined catalyst exotherm; and
    adjusting the catalyst exotherm to account for energy loss due to port oxidation where chemical energy is converted to heat in an exhaust port, the catalyst exotherm decreasing as a temperature of an exhaust port flange increases.

2. The method of claim 1, where the exhaust includes unburned fuel not trapped by a cylinder of the internal combustion engine and carried via the blowthrough air.

3. The method of claim 1, where the exhaust includes unburned fuel in excess of an amount corresponding to a stoichiometric air-fuel ratio inside a cylinder of the internal combustion engine.

4. The method of claim 3, wherein a chemical energy of unburned fuel in the exhaust equals a chemical energy in exhaust components from partial oxidation.

5. A method of operating an internal combustion engine having a turbocharger and a catalyst, the method comprising:
   boosting engine intake air;
   adjusting one or more of intake valve and exhaust valve timing to generate positive valve overlap between the intake valve and the exhaust valve in response to a driver tip-in, the boosting generating blowthrough air from an intake manifold to an exhaust manifold of the engine;
   fueling the internal combustion engine via direct injection for rich combustion during the boosting with positive valve overlap such that an air-fuel mixture in the exhaust of the rich combustion and blowthrough air is stoichiometric;
   determining a base temperature of the catalyst in response to exhaust temperature;
   determining an additional temperature rise of the catalyst during boosted positive valve overlap conditions based on an amount of blowthrough air and based on exhaust temperature, the additional temperature rise being determined to be smaller as exhaust temperature increases; and
   determining an estimate of catalyst temperature based on the base temperature and the additional temperature rise.

6. The method of claim 5, wherein the additional temperature rise is based on exhaust port temperature, and decreases as port temperature rises.

7. The method of claim 5, wherein the additional temperature rise is based on energy loss due to port oxidation where chemical energy is converted to heat in an exhaust port.

8. The method of claim 5, wherein the additional temperature rise is proportional to the amount of blowthrough air.

9. The method of claim 8, wherein the additional temperature rise is based on a total heat released from an oxidization of fuel in the exhaust and a total exhaust flow.

10. The method of claim 5, wherein the estimate of catalyst temperature is based on a sum of the base temperature and the additional temperature rise.

11. The method of claim 5, wherein the base temperature is based on air and fuel trapped in a cylinder.

12. The method of claim 5, wherein the internal combustion engine is a port fuel injection engine and where the blowthrough air includes a portion of fuel injected at an intake port into the exhaust manifold.

13. The method of claim 5, wherein fueling the engine for rich combustion during the boosting increases a temperature of the exhaust.

14. An engine method, comprising:
   during boosting, generating engine intake air blowthrough from an intake manifold to an exhaust manifold through positively overlapped intake and exhaust valves while combusting rich in an engine, where an exhaust mixture of the rich combustion and blowthrough air is stoichiometric; and
   reducing valve overlap responsive to a catalyst over-temperature, the catalyst temperature based on a blowthrough air amount and a degree of combustion richness generating exothermic heat in a catalyst.

* * * * *